United States Patent
Dijt et al.

(10) Patent No.: US 9,758,429 B2
(45) Date of Patent: Sep. 12, 2017

(54) SIZING COMPOSITIONS AND GLASS FIBER REINFORCED THERMOPLASTIC COMPOSITES

(75) Inventors: Jacob Cornelis Dijt, Eelde (NL); Jacob Hendricus Van Der Woude, Leek (NL); Ronald Boelman, Stadskaraal (NL)

(73) Assignee: PPG Industries Ohio, Inc., Cleveland, OH (US)

( * ) Notice: Subject to any disclaimer, the term of this patent is extended or adjusted under 35 U.S.C. 154(b) by 1806 days.

(21) Appl. No.: 12/002,320

(22) Filed: Dec. 14, 2007

(65) Prior Publication Data
US 2008/0241533 A1   Oct. 2, 2008

Related U.S. Application Data

(60) Provisional application No. 60/875,206, filed on Dec. 15, 2006.

(51) Int. Cl.
| | |
|---|---|
| C03C 25/28 | (2006.01) |
| C03C 25/26 | (2006.01) |
| C08J 5/08 | (2006.01) |
| C03C 25/32 | (2006.01) |
| D06M 15/592 | (2006.01) |
| D06M 15/55 | (2006.01) |

(52) U.S. Cl.
CPC ............ *C03C 25/285* (2013.01); *C03C 25/26* (2013.01); *C03C 25/328* (2013.01); *C08J 5/08* (2013.01); *D06M 15/55* (2013.01); *D06M 15/592* (2013.01); *D10B 2101/06* (2013.01); *Y10T 428/2933* (2015.01); *Y10T 428/2938* (2015.01); *Y10T 428/2964* (2015.01)

(58) Field of Classification Search
CPC ..... C03C 25/285; C03C 25/26; C03C 25/328; C08J 5/08; Y10T 428/2933; D06M 15/55; D06M 15/59–15/61; D10B 2101/06
USPC ....... 542/502, 442, 403, 416, 522, 271, 114, 542/539, 188, 400, 275, 492; 523/400
See application file for complete search history.

(56) References Cited

U.S. PATENT DOCUMENTS

| | | | |
|---|---|---|---|
| 3,167,468 A | 1/1965 | Lovelace et al. | |
| 3,249,412 A | 5/1966 | Kolek et al. | |
| 3,459,585 A | 8/1969 | Killmeyer et al. | |
| 3,803,069 A * | 4/1974 | McWilliams et al. | 523/414 |
| 3,814,592 A * | 6/1974 | McWilliams et al. | 65/448 |
| 3,935,344 A | 1/1976 | Haggerty et al. | |
| 3,997,306 A | 12/1976 | Hedden | |
| 4,049,865 A * | 9/1977 | Maaghul | 428/391 |
| 4,104,434 A | 8/1978 | Johnson | |
| 4,238,595 A | 12/1980 | Girgis | |
| 4,246,144 A | 1/1981 | Girgis | |
| 4,277,535 A | 7/1981 | Girgis | |
| 4,305,742 A | 12/1981 | Barch et al. | |
| 4,338,233 A | 7/1982 | Das et al. | |
| 4,341,877 A | 7/1982 | Das et al. | |
| 4,410,645 A | 10/1983 | Das et al. | |
| 4,435,474 A | 3/1984 | Das et al. | |
| 4,457,970 A | 7/1984 | Das et al. | |
| 4,477,496 A | 10/1984 | Das et al. | |
| 4,615,946 A * | 10/1986 | Temple | 428/361 |
| 5,034,444 A * | 7/1991 | Yun et al. | 524/223 |
| 2007/0079730 A1 | 4/2007 | Puckett | |
| 2010/0203331 A1* | 8/2010 | van der Woude et al. | 428/391 |

FOREIGN PATENT DOCUMENTS

WO    WO 2005/066237    7/2005

OTHER PUBLICATIONS

Hexion, EPON 828, Sep. 2005.*
Notification Concerning Transmittal of International Preliminary Report on Patentability) dated Jun. 25, 2009 for corresponding PCT application No. PCT/US2007/025697.
International Search Report and Written Opinion, International Application No. PCT/US2007/025697 filed Dec. 12, 2007, 11 pages.
F. Henning, H. Ernst and R. Brussel, LFT's for Automotive Applications, Feb. 2005, REINFORCEDplastics, pp. 24-33.

* cited by examiner

*Primary Examiner* — Frank Vineis
(74) *Attorney, Agent, or Firm* — Kilpatrick Townsend & Stockton LLP

(57) ABSTRACT

The present invention relates to sizing compositions, glass fibers at least partially coated with sizing compositions, and glass fiber reinforced composite materials. In one embodiment, a sizing composition comprises at least one maleic anhydride copolymer, at least one coupling agent, and a reaction product of an alkoxylated amine and a polycarboxylic acid, which is further reacted with an epoxy compound.

39 Claims, No Drawings

SIZING COMPOSITIONS AND GLASS FIBER REINFORCED THERMOPLASTIC COMPOSITES

RELATED APPLICATIONS

The present application hereby claims priority under 35 U.S.C. §119(e) to U.S. Provisional Patent Application Ser. No. 60/875,206 filed Dec. 15, 2006, which is incorporated herein by reference.

FIELD OF THE INVENTION

The present invention relates to sizing compositions, glass fibers at least partially coated with sizing compositions, and glass fiber reinforced composite materials.

BACKGROUND OF THE INVENTION

Glass fibers are typically treated after forming with a sizing composition that can impart desired properties. As used herein the term "size", "sized", "sizing" and "sizing composition" means a coating composition that can be applied to the glass fibers after formation of the fibers. After their formation and treatment, the sized glass fibers can be gathered into bundles or strands comprising a plurality of individual fibers.

A sizing composition can serve several functions. A sizing composition, for example, can serve as a lubricant, protecting fibers from abrasion with one another. A sizing composition can also function to enhance compatibility of glass fibers with the thermoplastic resins they reinforce.

Many glass fiber reinforced thermoplastic resins are used in the automotive industry. Glass fiber reinforced polyamide resins, for example, are often used to fabricate containers for various automotive fluids such as oil pans and radiator parts that encapsulate the core of the radiator. In recent years, manufacturing techniques have been developed to produce thermoplastic resins reinforced with long glass fibers. Processes such as G-LFT (Granular-Long Fiber Technology) and D-LFT (Direct-Long Fiber Technology) reinforce thermoplastic resins with fibers that maintain a sufficient length resulting in products with desirable mechanical properties and durability. Reinforcing thermoplastics with long glass fibers, however, presents several challenges including maintaining glass filament length and certain integrity during compounding or pultrusion processes while achieving sufficient wetting of the long fibers with thermoplastic resin, and others.

Moreover, once a long fiber thermoplastic (LFT) composite has been produced, certain end uses of the composite can involve exposure to harsh physical and chemical conditions that can lead to degradation of the composite through various pathways. The combination of high temperatures and exposure to aqueous organic solvent mixtures such as ethylene glycol and water, for example, can decrease the strength of some fiber reinforced polyamide resins.

SUMMARY

Some embodiments of the present invention relate to sizing compositions that can be used to at least partially coat one or more glass fibers. The glass fibers can be further processed in a number of ways and used in a number of applications, some of which are described herein. In one embodiment, a sizing composition comprises at least one maleic anhydride copolymer, at least one coupling agent, and a reaction product of an alkoxylated amine and a polycarboxylic acid, which is further reacted with an epoxy compound.

In some embodiments, the reaction product of an alkoxylated amine and a polycarboxylic acid, which is further reacted with an epoxy compound is present in an amount greater than about 40 weight percent of the sizing composition on a total solids basis. In another embodiment, the reaction product of an alkoxylated amine and a polycarboxylic acid, which is further reacted with an epoxy compound is present in an amount greater than about 50 weight percent of the sizing composition on a total solids basis. In some embodiments, the reaction product of an alkoxylated amine and a polycarboxylic acid, which is further reacted with an epoxy compound is present in an amount greater than about 70 weight percent of the sizing composition on a total solids basis.

In some embodiments, a sizing composition further comprises at least one additional component comprising a polyester, polyvinyl alcohol, polyurethane, polyvinylpyrrolidone, fatty acid ester of a polyethylene glycol, acrylic, wax, chemically modified rosin, or epoxide. In some embodiments, the at least one additional component is present in an amount of at least about 1 weight percent of the sizing composition on a total solids basis. In some embodiments, the at least one additional component is present in an amount of at least about 5 weight percent of the sizing composition on a total solids basis. In another embodiment, the at least one additional component is present in an amount up to about 50 weight percent of the sizing composition on a total solids basis. Additional embodiments of sizing compositions of the present invention are described below in the Detailed Description.

As to glass fibers, one embodiment of the present invention relates to a glass fiber at least partially coated with a sizing composition comprising at least one maleic anhydride copolymer, at least one coupling agent, and a reaction product of an alkoxylated amine and a polycarboxylic acid, which is further reacted with an epoxy compound. In some embodiments, the sizing composition further comprises at least one additional component comprising a polyester, polyvinyl alcohol, polyurethane, polyvinylpyrrolidone, fatty acid ester of a polyethylene glycol, acrylic, wax, chemically modified rosin, or epoxide. Additional embodiments glass fibers of the present invention are described below in the Detailed Description. In general, glass fibers according to various embodiments of the present invention can comprise a glass fiber at least partially coated with any of the sizing compositions disclosed herein.

Some embodiments of the present invention relate to fiber glass strands. In one embodiment, a fiber grass strand comprises a plurality of glass fibers, wherein at least one of the plurality of glass fibers is at least partially coated with a sizing composition comprising at least one maleic acid copolymer, at least one coupling agent, and a reaction product of an alkoxylated amine and a polycarboxylic acid, which is further reacted with an epoxy compound. In some embodiments, a sizing composition further comprises at least one additional component comprising a polyester, polyvinyl alcohol, polyurethane, polyvinylpyrrolidone, fatty acid ester of a polyethylene glycol, acrylic, wax, chemically modified rosin, or epoxide. Additional embodiments of fiber glass strands of the present invention are described below in the Detailed Description. In general, fiber glass strands according to various embodiments of the present invention can comprise a plurality of glass fibers, wherein at least one of the plurality of glass fibers is at least partially coated with any of the sizing compositions disclosed herein.

Some embodiments of the present invention relate to rovings comprising a plurality of fiber glass strands of the present invention. The rovings can be assembled, in some embodiments, by winding the plurality of strands into a single package using a roving winder. In other embodiments, the rovings can be assembled at a point of use such that the plurality of fiber glass strands are not wound into a single package, but rather are unwound from their respective packages (e.g., forming packages or direct draw packages), combined into a single roving, and provided to another processing unit. For example, the rovings (whether wound into a roving package or assembled at a point of use) can be provided to a bath comprising a thermoplastic resin, can be chopped, can be compounded, etc. Fiber glass strands and rovings can be continuous in some embodiments, while in other embodiments that can be shortened (e.g., chopped) prior to use. Thus, depending on the application, glass fiber strands and glass fiber rovings, according to some embodiments of the present invention, can be any desired length. Additional embodiments of rovings of the present invention are described below in the Detailed Description. In general, rovings can comprise a plurality of strands according to the various embodiments of strands, glass fibers, and sizing compositions disclosed herein.

Some embodiments of the present invention relate to glass fiber reinforced thermoplastic or thermoset composites. In one embodiment, a glass fiber reinforced thermoplastic or thermoset composite comprises a thermoplastic resin or thermoset resin and at least one glass fiber at least partially coated with a sizing composition comprising at least one maleic anhydride copolymer, at least one coupling agent, and a reaction product of an alkoxylated amine and a polycarboxylic acid, which is further reacted with an epoxy compound. Moreover, any of the sizing compositions disclosed herein as part of the present invention can be used in such composites. For example, in some embodiments of a composite, the sizing composition further comprises at least one additional component comprising a polyester, polyvinyl alcohol, polyurethane, polyvinylpyrrolidone, fatty acid ester of a polyethylene glycol, acrylic, wax, chemically modified rosin, or epoxide.

In some embodiments, thermoplastic resins reinforced with glass fibers of the present invention can comprise polyolefins such as polyethylene and polypropylene, polyamides, polyphenylene oxide, polystyrenics, or polyesters such as polybutylene terephthalate (PBT), or polyethylene terephthalate (PET) or combinations thereof. In some embodiments, thermoset resins reinforced with glass fibers of the present invention comprise polyester resins, polyimide resins, phenolic resins, vinyl ester resins, or epoxy resins or combinations thereof.

In some embodiments of fiber reinforced thermoplastic or thermoset composites, glass fibers have an average aspect ratio of at least 50. As used herein, "aspect ratio" refers to a glass fiber's length divided by the glass fiber's diameter (L/D). A fiber reinforced thermoplastic or thermoset composite, in one embodiment, comprises a plurality of glass fibers having an average aspect ratio of at least 100, or an average aspect ratio of at least 200 in other embodiments. In some embodiments, a fiber reinforced thermoplastic or thermoset composite comprises a plurality of glass fibers having an average aspect ratio of at least 500, or an average aspect ratio of at least 600 in other embodiments. A fiber reinforced thermoplastic or thermoset composite, in some embodiments, comprises a plurality of glass fibers having an average aspect ratio less than 1500. In other embodiments, a fiber reinforced thermoplastic or thermoset composite comprises a plurality of glass fibers having an average aspect ratio less than 1200, or an average aspect ratio less than 1000 in other embodiments. In some embodiments, a fiber reinforced thermoplastic or thermoset composite comprises a plurality of glass fibers having an average aspect ratio greater than 1500.

The amount of glass fibers used in some embodiments of thermoplastic or thermoset composites of the present invention can also be important. In some embodiments, the plurality of glass fibers are present in an amount of at least about 10 weight percent of the composite. In some embodiments, the plurality of glass fibers are present in an amount greater than about 40 weight percent of the composite. In some embodiments, the plurality of glass fibers are present in an amount greater than about 50 weight percent of the composite. In some embodiments, the plurality of glass fibers are present in an amount up to about 70 weight percent of the composite. In one embodiment, the plurality of glass fibers are present in an amount up to about 90 weight percent of the composite. In some embodiments, the plurality of glass fibers have an average aspect ratio consistent with any of the aspect ratios described herein. A fiber reinforced thermoplastic or thermoset composite comprising a plurality of glass fibers, in some embodiments, can be in the form of a pellet.

In another aspect, some embodiments of the present invention relate to methods of making a glass fiber reinforced thermoplastic or thermoset composite. In some embodiments, a method of making a fiber reinforced thermoplastic or thermoset composite comprises providing a plurality of continuous glass fibers, at least partially coating the plurality of continuous glass fibers with a sizing composition comprising at least one maleic anhydride copolymer, at least one coupling agent, and a reaction product of an alkoxylated amine and a polycarboxylic acid, which is further reacted with an epoxy compound and disposing the plurality of coated continuous glass fibers in a thermoplastic or thermoset resin. In some embodiments, disposing the plurality of coated continuous glass fibers in a thermoplastic or thermoset resin comprises drawing the plurality of coated continuous glass fibers into a liquid thermoplastic or thermoset resin. Any of the sizing compositions disclosed herein as part of the present invention can be used in making such composites. For example, in some embodiments, the sizing composition can further comprise at least one additional component comprising a polyester, polyvinyl alcohol, polyurethane, polyvinylpyrrolidone, fatty acid ester of a polyethylene glycol, acrylic, wax, chemically modified rosin, or epoxide.

Methods of making a fiber reinforced thermoplastic or thermoset composite, according to some embodiments, can further comprise chopping the plurality of continuous glass fibers. The glass fibers can be chopped prior to being dispersed in resin in some embodiments. In other embodiments, the glass fibers and thermoplastic or thermoset resin (after the glass fibers are disposed in the resin) can be chopped into pellets. The chopped fibers and/or pellets, in some embodiments, can have aspect ratios as provided herein. In other embodiments, a method of making a fiber reinforced thermoplastic or thermoset composite further comprises molding the plurality of continuous glass fibers and thermoplastic or thermoset resin. Additional embodiments of manufacturing fiber reinforced thermoplastic or thermoset composites are described below in the Detailed Description.

While some embodiments of methods according to the present invention refer to glass fibers, it should be understood to those of skill in the art that the glass fibers can be in the form of strands, rovings comprising a plurality of strands, and other fiber glass products.

These and other embodiments are described in greater detail in the Detailed Description which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It is further noted that, as used in this specification, the singular forms "a," "an," and "the" include plural referents unless expressly and unequivocally limited to one referent.

In some embodiments, sizing compositions of the present invention comprise at least one maleic anhydride copolymer, at least one coupling agent, and a reaction product of an alkoxylated amine and polycarboxylic acid, which is further reacted with an epoxy compound.

In some embodiments, the reaction product of an alkoxylated amine and a polycarboxylic acid, which is further reacted with an epoxy compound is present in an amount greater than about 40 weight percent of the sizing composition on a total solids basis. In another embodiment, the reaction product of an alkoxylated amine and a polycarboxylic acid, which is further reacted with an epoxy compound is present in an amount greater than about 50 weight percent of the sizing composition on a total solids basis. In some embodiments, the reaction product of an alkoxylated amine and a polycarboxylic acid, which is further reacted with an epoxy compound is present in an amount greater than about 70 weight percent on a total solids basis.

In some embodiments, a sizing composition of the present invention further comprises at least one additional component comprising a polyester, polyvinyl alcohol, polyurethane, polyvinylpyrrolidone, fatty acid ester of a polyethylene glycol, acrylic, wax, chemically modified rosin, or epoxide.

Turning now to components that can be included in varying embodiments of sizing compositions of the present invention, a sizing composition of the present invention can comprise at least one maleic anhydride copolymer. In some embodiments, the maleic anhydride copolymer comprises maleic anhydride monomer and monomer selected from the group consisting of ethylene, butadiene, isobutylene, and mixtures thereof. In other embodiments, the maleic anhydride copolymer comprises maleic anhydride monomer and monomer selected from the group consisting of ethylene, butadiene, and mixtures thereof. In further embodiments, the maleic anhydride copolymer comprises maleic anhydride monomer and isobutylene.

In some embodiments, the maleic anhydride copolymer comprises maleic anhydride monomer and copolymerizable monomer, wherein a portion of the maleic anhydride copolymer is chemically modified by ammonia or a primary alkyl amine. In other embodiments, the maleic anhydride copolymer comprises maleic anhydride monomer and copolymerizable monomer, wherein a portion of the maleic anhydride copolymer is chemically modified by ammonia. In another embodiment, the maleic anhydride copolymer comprises maleic anhydride monomer and copolymerizable monomer, wherein the maleic anhydride copolymer is chemically modified by a primary alkyl amine. Moreover, chemically modifying a portion of the maleic anhydride copolymer with ammonia can convert a portion of the maleic anhydride monomers to maleimide monomers. Chemically modifying a portion of the maleic anhydride copolymer with a primary alkyl amine can convert a portion of the maleic anhydride monomers to alkyl substituted maleimide monomers.

In another embodiment, the maleic anhydride copolymer comprises maleic anhydride monomer, copolymerizable monomer, and monomer selected from the group consisting of maleimide monomer, alkyl substituted maleimide monomer, and mixtures thereof. In some embodiments, the maleic anhydride copolymer comprises maleic anhydride monomer, copolymerizable monomer, and maleimide monomer. In other embodiments, the maleic anhydride copolymer comprises maleic anhydride monomer, copolymerizable monomer, and alkyl substituted maleimide monomer.

As used herein, the term "maleic anhydride monomer" includes maleic anhydride and maleic acid in the free acid, salt, or partial salt form. As used herein, the term "partial salt" refers to maleic anhydride monomers having two carboxy groups where one carboxy group is in the free acid form and one carboxy group is converted to a salt. As used herein, the term "maleimide monomer" includes maleimide, maleic diamide, and maleic acid amide in the free acid or salt form. As used herein, the term "alkyl substituted maleimide monomer" includes N-alkyl maleimide, N,N'-dialkyl maleic diamide, and N-alkyl maleic acid amide in the free acid or salt form.

The maleic anhydride copolymer, in some embodiments, is formed from the polymerization of maleic anhydride or maleic acid with a copolymerizable monomer such as, but not limited to, ethylene, butadiene, isobutylene, and isobutylene. As previously described, the maleic anhydride copolymer, in some embodiments, can also include terpolymers comprising maleic anhydride monomer, copolymerizable monomers, and monomer selected from the group consisting of maleimide monomer, alkyl substituted maleimide monomer, and mixtures thereof.

The ratio of monomers in the maleic anhydride copolymer is not particularly limited, so long as the maleic anhydride copolymer is operable to maintain or improve the hydrolysis resistance and/or strength of a reinforced thermoplastic resin. In embodiments where the maleic anhydride copolymer is formed from a reaction mixture comprising maleic anhydride and a copolymerizable monomer, the resulting maleic anhydride copolymer can be in many instances an alternating copolymer of the two reactants. Further chemical modification of the alternating maleic anhydride copolymer, in some embodiments, produces maleic anhydride copolymers where the ratio of maleic anhydride, maleimide, and N-substituted maleimide monomers to a copolymerizable monomer is 1:1.

An aqueous solution of the maleic anhydride copolymer may be used when formulating some embodiments of sizing compositions of the present invention. For maleic anhydride copolymers having maleic anhydride monomers in the anhydride form, the maleic anhydride copolymer may be poorly soluble when dispersed in water at room temperature. The solubility of the maleic anhydride copolymer can be improved by heating an aqueous solution of the maleic anhydride copolymer and converting anhydride groups of the maleic anhydride copolymer to the corresponding polyacids. The aqueous solution formed by the hydrolysis may then be used to formulate the sizing composition.

Upon hydrolysis, free acid groups of the maleic anhydride copolymer can be further converted from the free acid to a salt. In an alternate method of preparing an aqueous solution of the maleic anhydride copolymer, maleic anhydride copolymers having maleic anhydride monomers in the anhydride form can be heated in an aqueous solution of ammonium hydroxide or an aqueous solution of a primary alkyl amine. The reaction mixture may be heated under pressure to temperatures above 100° C. Depending on the reaction conditions and whether ammonium hydroxide or a primary alkyl amine is present, some or all of the anhydride groups may be converted to polyacids, salts, partial salts, diamides, partial amides, imides, and mixtures thereof.

Formation of diamides, partial amides, and imides in the maleic anhydride copolymer, in some embodiments, imparts advantageous properties to fiber reinforced polyamides. Formation of these functionalities may provide maleic anhydride copolymers an affinity for reacting with the amine-terminal group of a polyamide resin through a transamidation reaction mechanism.

A salt of the hydrolyzed maleic anhydride may be that of alkali metal or ammonium salts either derived from ammonium hydroxide or from an organic primary, secondary or tertiary amine poly- or monofunctionalized, e.g. triethylamine and triethanolamine. The degree of neutralization of the hydrolyzed maleic anhydride can vary. In an embodiment, a maleic anhydride copolymer is neutralized with a 25% ammonium hydroxide aqueous solution. As used herein, the term "copolymerizable monomer" refers to materials that can be copolymerized with maleic anhydride and include, but are not limited to, aliphatic olefins, vinyl ethers, vinyl acetates, and other vinyl type monomers. The copolymerizable aliphatic olefins are of the general formula (I):

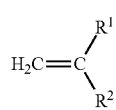

(I)

wherein $R^1$ and $R^2$ are each independently selected from the group consisting of hydrogen, alkyl, and alkenyl groups having from 1 to 12 carbon atoms. Examples of aliphatic olefins suitable for copolymerizing with maleic anhydride are ethylene, butadiene, and isobutylene. An example of a vinyl ether suitable for copolymerizing with maleic anhydride is isobutylene.

The amount and type of maleimide monomer or N-substituted maleimide monomer in the maleic anhydride copolymer, in some embodiments, is determined by considerations such as a desired reactivity of the maleic anhydride copolymer with a particular thermoplastic resin, such as a polyamide resin, or a desired viscosity for the sizing composition. A greater number of amide or imide groups in a maleic anhydride copolymer, for example, may increase the reactivity of the maleic anhydride copolymer with the amino terminal groups of a polyamide resin. Further, a greater number of amide or imide groups in a maleic anhydride copolymer may reduce the solubility of the maleic anhydride copolymer in aqueous solution. Acid derivatives such as esters may not provide acceptable reactivity with a polyamide resin relative to amides, imides, anhydrides, free acids, and salts.

In an embodiment, the maleic anhydride copolymer is an alternating copolymer of maleic anhydride monomer and ethylene. An alternating copolymer of maleic anhydride and ethylene can be purchased from Zeeland Chemicals, Inc. In another embodiment, the maleic anhydride copolymer is an alternating copolymer of maleic anhydride monomer and butadiene. An alternating copolymer of maleic anhydride and butadiene known as MALDENE 286 can be purchased from Lindau Chemicals, Inc. In another embodiment, the maleic anhydride copolymer is an alternating copolymer of maleic anhydride monomer and isobutylene. In another embodiment, the maleic anhydride copolymer is an alternating copolymer of maleic anhydride monomer and isobutylene. An alternating copolymer of maleic anhydride monomer and isobutylene known as IREZ 160 may be purchased from International Specialty Products.

The amount of maleic anhydride copolymer in the sizing composition may depend upon various factors. The lower limit of maleic anhydride copolymer, in some embodiments, may be determined by the amount effective to maintain or improve hydrolysis resistance of a reinforced thermoplastic resin. In an embodiment where sized glass fibers are to be used to reinforce a thermoplastic polyamide resin, for example, the amount of maleic anhydride copolymer in the sizing composition effective to maintain or improve hydrolysis resistance of the thermoplastic polyamide resin may be greater than 1% by weight based on total solids. The lower limit of maleic anhydride copolymer, in some embodiments of polyamide reinforcement, may also be determined by the minimum amount operable to provide suitable reactivity with a polyamide resin. In some embodiments, the maleic anhydride copolymer may be present in an amount greater than 10% by weight on a total solids basis. Moreover, the upper limit of maleic anhydride copolymer can be less than 50% by weight based on total solids in some embodiments. In some embodiments, the amount of maleic anhydride copolymer in the sizing composition can range from about 5 to 25% by weight based on total solids. In some embodiments, the maleic anhydride copolymer is present in an amount up to about 40 weight percent of the sizing composition on a total solids basis.

In some embodiments, a sizing composition of the present invention comprises a polymer or oligomer comprising a plurality of acid functionalities, including carboxylic acid functionalities, in place of a maleic anhydride copolymer. In one embodiment, a polymer or oligomer comprising a plurality of acid functionalities comprises one or more acrylics, including polyacrylic acid (PAA), polymethacrylic acid (PMA), polymethylmethacrylate (PMMA), and copolymers thereof. In some embodiments, an acrylic comprises copolymers of acrylic monomers, including acrylic acid, methacrylic acid, and methylmethacrylate, with styrene. An acrylic/styrene copolymer, in one embodiment, comprises at least 5 weight percent acrylic. In another embodiments, an acrylic/styrene copolymer comprises from 10 weight percent to 50 weight percent acrylic.

In some embodiments, a polymer or oligomer comprising a plurality of acid functionalities suitable for replacing a maleic anhydride copolymer is present in an amount of at least 5 weight percent of the sizing composition on a total solids basis. In other embodiments, a polymer or oligomer comprising a plurality of acid functionalities is present in an amount of at least 10 weight percent of the sizing composition on a total solids basis. A polymer or oligomer comprising a plurality of acid functionalities suitable for replacing a maleic anhydride copolymer is present, in some embodiments, in an amount less than 30 weight percent on a total solids basis. In some embodiments, a polymer or oligomer comprising a plurality of acid functionalities is present in an amount less than 20 weight percent on a total solids basis.

Some embodiments of sizing compositions of the present invention additionally comprise at least one coupling agent. Silane coupling agents useful in sizing compositions of the present invention comprise a functional group that is capable of chemically bonding with the surface of fiber glass and a second functional group that is capable of chemically bonding with a resin. Thus, a particular silane coupling agent included in the sizing composition may be determined by the resin in which sized glass fibers are used to reinforce. Two or more coupling agent can be used jointly. Silane coupling agents useful in some embodiments of the present invention can comprise amino silanes. Examples of amino silanes potentially useful in embodiments of sizing compositions for polyamide resin reinforcement can comprise amino silanes such as aminopropyltrialkyloxy silanes such as γ-aminopropyltrimethoxysilane, γ-aminopropyltriethoxysilane, and diaminosilanes such as N-β(aminoethyl)γ-aminopropylmethyldimethoxysilane, N-β(aminoethyl)γ-aminopropyltrimethoxysilane and N-β(aminoethyl)γ-aminopropyltriethoxysilane. In one embodiment where the sized glass fibers are used to reinforce a polyamide resin, the coupling agent can comprise γ-aminopropyl triethoxysilane, such as DYNASYLAN AMEO, commercially available from Degussa AG of Dusseldorf, Germany and A-1100 commercially available from Osi Specialties of Tarrytown, N.Y. Other silane coupling agents can be used based, for example, on the resin to be reinforced by the sized fibers. For example, in embodiments where a polyethylene or polybutylene terephthalate thermoplastic resin is reinforced, a suitable coupling agent may include an epoxysilane in some embodiments.

The amount of the coupling agent in the sizing composition can depend upon various factors such as, but not limited to, the coupling agent's affinity for a particular resin and the coupling agent's compatibility with the other components of the sizing composition. In some embodiments, the coupling agent may be present in an amount up to about 10 weight percent of the sizing composition on a total solids basis. In some embodiments, the coupling agent may be present in an amount up to about 20 weight percent of the sizing composition on a total solids basis. In other embodiments, the coupling agent may be present in an amount greater than about 2 weight percent on a total solids basis. In some embodiments, the coupling agent may be present in an amount greater than about 4 weight percent on a total solids basis. In some embodiments, the coupling agent may be present in an amount up to about 15 weight percent on a total solids basis. The coupling agent, in some embodiments may be present in an amount less than about 7 weight percent on a total solids basis. In a further embodiment where the coupling agent comprises γ-aminopropyltriethoxysilane, the amount of coupling agent may range from 2 to 7% by weight based on total solids.

In some embodiments, a sizing composition of the present invention also comprises a reaction product of an alkoxylated amine and a polycarboxylic acid, which is further reacted with an epoxy compound. In some embodiments, such a reaction product is present in an amount greater than about 40 weight percent of the sizing composition on a total solids basis. In other embodiments, a reaction product of an alkoxylated amine and a polycarboxylic acid, which is further reacted with an epoxy compound is present in an amount greater than about 50 weight percent of the sizing composition on a total solids basis. In some embodiments, a reaction product of an alkoxylated amine and a polycarboxylic acid, which is further reacted with an epoxy compound is present in an amount greater than about 70 weight percent of the sizing composition on a total solids basis.

A reaction product of an alkoxylated amine and a polycarboxylic acid, which is further reacted with an epoxy compound, in some embodiments, comprises a reaction product as set forth in U.S. Pat. No. 3,459,585, which is hereby incorporated by reference in its entirety.

In some embodiments, an alkoxylated amine for reaction with a polycarboxylic acid has a general formula (II):

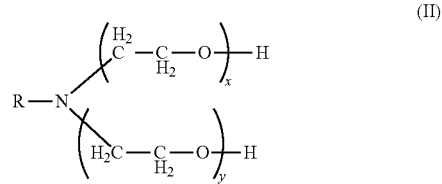

wherein R is selected from the group consisting of hydrogen, a saturated or unsaturated alkyl, -aryl, -arylalkyl, and -alkylaryl radical containing 1 to 30 carbon atoms. In some embodiments, x and y independently range from 1 to 100. In some embodiments, x and y independently range from 20 to 50. In other embodiments x and y independently range from 30 to 60.

In other embodiments, an alkoxylated amine for reaction with a polycarboxylic acid has a general formula (III):

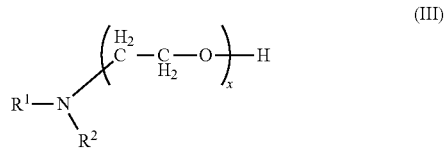

wherein $R^1$ and $R^2$ are independently selected from the group consisting of hydrogen, a saturated or unsaturated alkyl, -aryl, -arylalkyl, and -alkylaryl radical containing 1 to 30 carbon atoms. In some embodiments x ranges from 1 to 100. In some embodiments, x ranges from 20 to 50. In other embodiments, x ranges from 30 to 60.

In some embodiments, an alkoxylated amine for reaction with a polycarboxylic acid comprises an alkoxylated fatty amine. In some embodiments, for example, an alkoxylated fatty amine comprises an alkoxylated stearyl amine, an alkoxylated dodecyl amine, an alkoxylated tetradecyl amine, an alkoxylated hexadecyl amine, or an alkoxylated octadecyl amine.

In some embodiments, an alkoxylated amine for reaction with a polycarboxylic acid comprises a propoxylated amine or a butoxylated amine. Embodiments of sizing compositions of the present invention contemplate any number of carbon atoms in the alkoxy moiety (e.g. ethoxy, propoxy, butoxy, pentoxy, etc.) of the alkoxylated amine consistent with providing the sizing compositions the desired properties disclosed herein. In some embodiments, the molecular weight of an alkoxylated amine for reaction with a polycarboxylic acid can range from about 100 to about 10,000.

In some embodiments, an alkoxylated amide can be used in place of an alkoxylated amine in producing a reaction product for use in a sizing composition of the present invention. In some embodiments, an alkoxylated amide has general formula (IV):

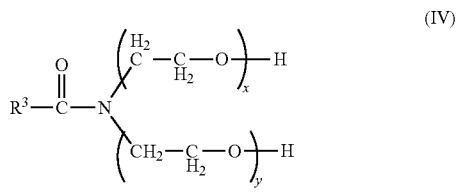

(IV)

wherein $R^3$ is selected from the group consisting of a saturated or unsaturated alkyl, -aryl, -arylalkyl, and -alkylaryl radical containing 1 to 30 carbon atoms and wherein x and y independently range from 1 to 100. In some embodiments, x and y independently range from 20 to 50. In some embodiments, x and y independently range from 30 to 60.

In another embodiment, an alkoxylated amide for reaction with a polycarboxylic acid has a general formula (V):

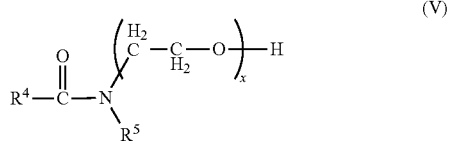

(V)

wherein $R^4$ and $R^5$ are independently selected from the group consisting of hydrogen, a saturated or unsaturated alkyl, -aryl, -arylalkyl, and -alkylaryl radical containing 1 to 30 carbon atoms and wherein x ranges from 1 to 100. In some embodiments, x ranges from 20 to 50. In some embodiments, x and y range from 30 to 60.

In some embodiments, an alkoxylated amide for reaction with a polycarboxylic acid comprises a propoxylated amine or a butoxylated amide. Embodiments of sizing compositions of the present invention contemplate any number of carbon atoms in the alkoxy moiety (e.g. ethoxy, propoxy, butoxy, pentoxy, etc.) of the alkoxylated amide consistent with providing the sizing compositions the desired properties disclosed herein. In some embodiments, the molecular weight of an alkoxylated amide for reaction with a polycarboxylic acid can range from about 100 to about 10,000.

Polycarboxylic acids suitable for reaction with an alkoxylated amine or alkoxylated amide, in some embodiments, comprise oxalic, malonic, succinic, glutaric, adipic, pimelic, suberic, azelaic, sebacic, maleic, fumaric, itaconic, citraonic, mesaconic, muconic, 1,2-cyclohexanedicarboxylic, 1,4-cyclohexanedicarboxylic, malic, tartaric, phthalic, isophthalic, terephthalic, tetrahydrophthalic, tetrachlorophthalic, tricarballylic acids, and the corresponding acid anhydrides of the foregoing acids.

A suitable epoxy compound for further reaction with the reaction product of an alkoxylated amine or alkoxylated amide and polycarboxylic acid comprises a chemical species having at least one epoxy moiety of the general formula (VI):

(VI)

Such epoxy compounds are well know in the art and, in some embodiments, may be polymeric or oligomeric. In one embodiment, an epoxy compound comprises a polyepoxide compound such as a diglycidyl ether, diglycidyl ester, or mixtures thereof. In some embodiments, a diglycidyl ether comprises an alkyl or aromatic diglycidyl ether. In some embodiments, a diglycidyl ester comprises an alkyl or aromatic diglycidyl ester.

In some embodiments, a reaction product of an alkoxylated amine and a polycarboxylic acid, which is further reacted with an epoxy compound can be produced by reacting one mole of a primary alkoxylated amine of formula (II) with two moles of a polycarboxylic acid. The resulting reaction intermediate is subsequently reacted with two moles of an epoxy compound. While not wishing to be bound by any theory, it is believed that, in the foregoing reaction scheme, one carboxyl group of each mole of the polycarboxylic acid esterifies with one of the terminal hydroxyl groups of the alkoxylated primary amine, thereby leaving two carboxyl groups available for further reaction. Each of the available carboxyl groups is subsequently esterified by reaction with an epoxy group of the epoxy compound. In some embodiments wherein a polyepoxide compound is used, the resulting reaction product can have epoxy groups available for further reaction.

In one embodiment, for example, one mole of an alkoxylated primary amine is reacted with two moles of polycarboxylic acid derived from phthalic anhydride to produce the intermediate (VII) having two carboxyl groups available for further reaction.

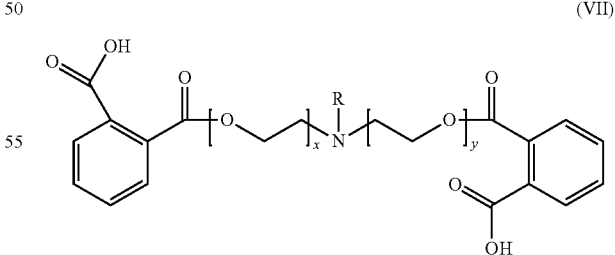

(VII)

Intermediate (VII) is subsequently reacted with two moles of a Bisphenol A diglycidal ether having an epoxide equivalent of 186 to 189. The available carboxyl groups on intermediate (VII) are each esterified with by reaction with an epoxy group of the Bisphenol A diglycidal ether to produce the reaction product (VIII).

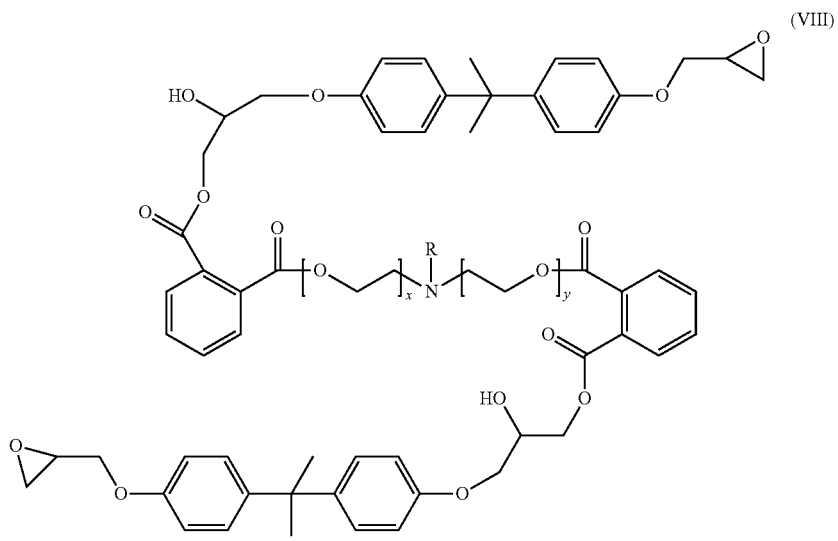

Reaction product (VIII) can be incorporated into sizing compositions according to some embodiments of the present invention.

In another embodiment, a reaction product of an alkoxylated amine and a polycarboxylic acid, which is further reacted with an epoxy compound can be produced by reacting one mole of an alkoxylated amine of formula (III) with one mole of a polycarboxylic acid. The resulting intermediate product is subsequently reacted with a diepoxy compound in a 2:1 molar ratio of intermediate product to diepoxy compound. While not wishing to be bound by any theory, it is believed that, in the foregoing reaction scheme, one carboxyl group of the polycarboxylic acid esterifies with the terminal hydroxyl group of the alkoxylated secondary amine, thereby leaving at least one carboxyl group available for further reaction. The available carboxyl group is subsequently esterified by reaction with an epoxy group of the epoxy compound.

In one embodiment, for example, one mole of an alkoxylated secondary amine is reacted with one mole of polycarboxylic acid derived from phthalic anhydride to produce an intermediate having one carboxyl group available for further reaction. The intermediate is subsequently reacted with a Bisphenol A diglycidal ether having an epoxide equivalent of 186 to 189 in a 2:1 mole ratio. Each epoxy group of the Bisphenol A diglycidal ether is subsequently esterified by the free carboxyl group of the intermediate to produce a reaction product of formula (IX).

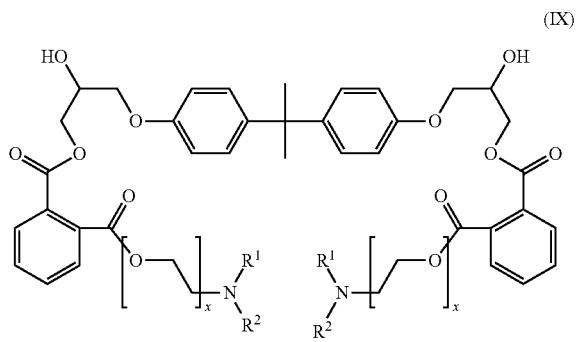

Reaction product (IX) can be incorporated into sizing compositions according to some embodiments of the present invention.

An additional reaction product of an alkoxylated amine and a polycarboxylic acid, which is further reacted with an epoxy compound suitable for use in some embodiments of a sizing composition of the present invention is available from Hexion Specialty Chemicals under the designation RD1135-B.

In some embodiments, a sizing composition of the present invention further comprises at least one additional component comprising a chemically modified rosin, polyvinyl alcohol, acrylic, polyurethane, polyester, epoxide, polyvinylpyrrolidone, fatty acid ester of polyethylene glycol, or wax.

In some embodiments, the at least one additional component is present in an amount of at least about 1 weight percent of the sizing composition on a total solids basis. In some embodiments, the at least one additional component is present in an amount of at least about 5 weight percent of the sizing composition on a total solids basis. In another embodiment, the at least one additional component is present in an amount up to about 50 weight percent of the sizing composition on a total solids basis.

Chemically modified rosins suitable for use in sizing compositions of the present invention, in some embodiments, comprise the chemically modified rosins set forth in U.S. patent application Ser. No. 11/386,898, now issued as U.S. Pat. No. 7,709,599, which is hereby incorporated by reference in its entirety. In some embodiments, a chemically modified rosin suitable for use in a sizing composition of the present invention is of the formula (X):

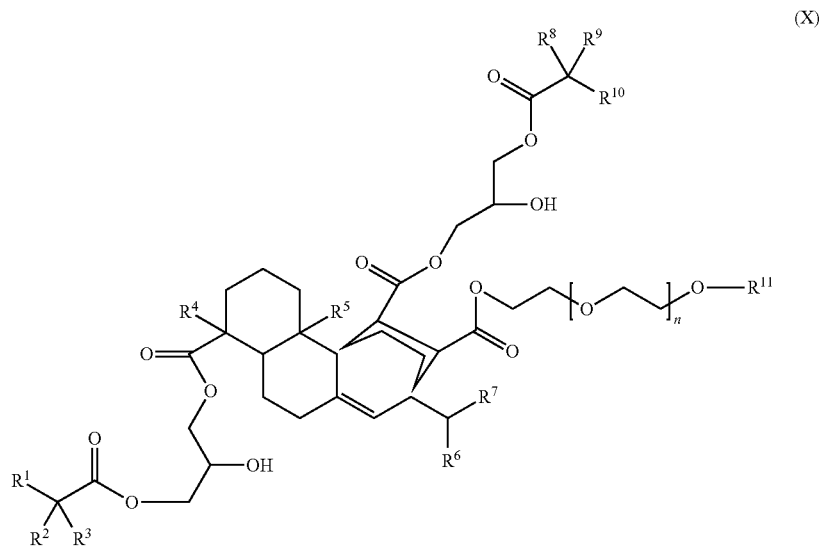

(X)

wherein $R^1$, $R^2$, $R^3$, $R^4$, $R^5$, $R^6$, $R^7$, $R^8$, $R^9$, $R^{10}$, and $R^{11}$ are the same or different and are independently selected from the group consisting of hydrogen, -alkyl, -alkenyl, -alkynyl, -alkoxyl, -thioalkyl, -amine, -alkyl-amine, -alkenyl-amine, -hydroxyl, -alkyl-OH, -alkenyl-OH, -carboxyl, -alkyl-(COOH), and -alkenyl-(COOH).

In other embodiments, a chemically modified rosin that can be used in some embodiments of sizing compositions of the present invention comprises DYNAKOLL Si 100 rosin which is commercially available from Eka Chemicals AB, Sweden.

The at least one additional component, according to some embodiments, can comprise polyvinyl alcohol. Polyvinyl alcohols suitable for use in some embodiments of sizing compositions of the present invention can comprise polyvinyl alcohols derived from polyvinyl acetate by hydrolysis or saponification processes. A wide variety of grades of polyvinyl alcohol are available and are often classified according to degrees of hydrolysis and viscosity. Suppliers of polyvinyl alcohol typically characterize their polyvinyl alcohol products based on degree of hydrolysis, and the term "degree of hydrolysis" is intended to have the same meaning herein as understood by the those of ordinary skill in the art.

In the present application, polyvinyl alcohol may be characterized in terms of degree of hydrolysis. In some embodiments, a polyvinyl alcohol for use in sizing compositions of the present invention can be greater than 80% hydrolyzed. In other embodiments, the polyvinyl alcohol can be greater than 85% hydrolyzed. In another embodiment, the polyvinyl alcohol can be greater than 98% hydrolyzed.

A polyvinyl alcohol, according to some embodiments of the present invention, can comprise polyvinyl alcohol having a particular average degree of hydrolysis. In other embodiments, the polyvinyl alcohol component comprises a mixture of polyvinyl alcohols having different average degrees of hydrolysis. In one embodiment, for example, a polyvinyl alcohol component of a sizing composition comprises a mixture of a polyvinyl alcohol greater than 85% percent hydrolyzed and a polyvinyl alcohol greater than 98% hydrolyzed. Embodiments of the present invention contemplate mixtures of polyvinyl alcohols in any combination.

Non-limiting examples of commercially available polyvinyl alcohols that can be used in some embodiments of sizing compositions of the present invention can include CELVOL® series polyvinyl alcohols available from Celanese Corporation. Several examples of CELVOL® series polyvinyl alcohols that can be used in various embodiments of sizing compositions of the present invention are provided in Table 1.

TABLE 1

CELVOL ® Series Polyvinyl Alcohols

| Polyvinyl Alcohol | Hydrolysis % | Viscosity mPa (4%/20° C.) |
|---|---|---|
| CELVOL ® 205 | 88 | 5.7 |
| CELVOL ® 203 | 88 | 4.0 |
| CELVOL ® 502 | 88 | 3.4 |
| CELVOL ® 305 | 98.4 | 5.0 |
| CELVOL ® 103 | 98.4 | 4.0 |

Additional non-limiting examples of commercially available polyvinyl alcohols that can be used in some embodiments of sizing compositions of the present invention comprise MOWIOL® series polyvinyl alcohols available from Kuraray Specialties Europe. Several examples of MOWIOL® series polyvinyl alcohols that can be used in various embodiments of sizing compositions of the present invention are provided in Table 2.

TABLE 2

MOWIOL ® Series Polyvinyl Alcohols

| Polyvinyl Alcohol | Hydrolysis % | Viscosity mPa (4%/20° C.) |
|---|---|---|
| MOWIOL ® 4-88 | 87.7 | 4.0 |
| MOWIOL ® 3-83 | 82.6 | 3.0 |
| MOWIOL ® 3-98 | 98.4 | 3.5 |

The at least one additional component, in some embodiments of a sizing composition of the present invention, can comprise acrylics and derivatives thereof. Acrylics, in some embodiments, can comprise monomeric, oligomeric, and polymeric forms of acrylic and methacrylic acids and esters, acrylonitrile, and acrylamide. In one embodiment, for example, acrylics can comprise methacrylate and methylmethacrylate monomers. In other embodiments, acrylics can comprise oligomers and polymers having one or more acrylic acid moieties, such as polyacrylic acid (PAA), polymethacrylic acid (PMA), and polymethylmethacrylate (PMMA) and copolymers thereof. In some embodiments, the acrylic acid moieties can be incorporated into the backbone of the oligomers or polymer or can otherwise be substituents coupled to the backbone.

In some embodiments, the at least one additional component of a sizing composition of the present invention can comprises a polyurethane. Polyurethanes, in some embodiments, can comprise aqueous dispersions of polyurethane, such as WITCOBOND W-290H and WITCOBOND W-296, both of which are commercially available from Crompton Corporation-Uniroyal Chemical, and Aquathane 516, available from Reichhold Chemical Company. Other suitable aqueous dispersions of polyurethane include Hydrosize U2-01, commercially available from Hydrosize Technologies, Inc. of Raleigh, N.C.

In other embodiments where thermoplastic polyamide resins are reinforced, various polyurethane dispersions can be useful such as aqueous solutions of polyurethane polymers formed by a reaction between an organic isocyanate or polyisocyanate and an organic polyhydroxylated compound or hydroxyl terminated polyether or polyester polymer. The polyurethane dispersion may contain a crosslinking group. Another example of a suitable polyurethane is an aqueous emulsion of a polyether-polyurethane NAJ-1037 from Bayer Chemical. Further, the polyurethane may be part of a dispersion comprising a polyurethane and a blocked isocyanate. For example, the following polyurethane/blocked isocyanate emulsions may be suitable for use in the sizing compositions of the present invention: WITCOBOND 60X (Crompton), Baybond 403 (Bayer), Baybond PU-130 (Bayer), Baybond XP-7055 (Bayer), Nopco D641 (Henkel), Neoxil 6158 (DSM), and Vestanat EP-DS-1205 (Degussa).

In some embodiments, the at least one additional component comprises a blocked isocyanate. As used herein, the term "blocked isocyanate" refers to any isocyanate where the isocyanate groups have been reacted with a compound so that the resultant blocked isocyanate is stable to active hydrogens at 25° C., and reactive with active hydrogens at a temperature below the temperature at which any film-former present in the sizing composition reacts. Two or more blocked isocyanates may be used jointly.

In the preparation of the blocked organic isocyanates, any suitable organic polyisocyanate may be used. A suitable organic polyisocyanate may be determined by the polyisocyanate's ability to interact with a thermoplastic resin, and/or by the polyisocyanate's ability to interact with the maleic anhydride copolymer, such as, but not limited to, during drying of the sizing composition and during extrusion. Representative examples of organic polyisocyanates which may be suitable organic polyisocyanates are aliphatic compounds such as trimethylene, tetramethylene, hexamethylene and butylidene diisocyanate, or the necessary to form isophorone diisocyanate (IPDI); cycloalkylene compounds such as 1,4-cyclohexane diisocyanate; aromatic compounds such as p-phenylene diisocyanate; aliphatic-aromatic compounds such as 4,4'-diphenylene methane diisocyanate, 2,4- or 2,6-tolylene diisocyanate or mixtures thereof. Representative examples of higher polyisocyanates are triisocyanates such as triphenylmethane-4,4',4"-triisocyanate and 2,4,6-triisocyanate toluene. Additional examples of organic polyisocyanates that may be used when practicing this invention include those of the biuret type and those for which a di- or trimerization reaction has produced four-, five- or six-membered rings. Among the six-membered rings, there may be mentioned the isocyanuric rings derived from a homo- or hetero-trimerization of various diisocyanates alone, with other isocyanate(s) (e.g., mono-, di- or polyisocyanate(s)) or with carbon dioxide. In this latter case, a nitrogen from the isocyanuric ring is replaced by an oxygen.

The at least one additional component of a sizing composition of the present invention, in some embodiments, can comprise a polyester. Polyesters suitable for use in some embodiments of sizing compositions of the present invention can comprise saturated and/or unsaturated linear polyesters. In other embodiments, suitable polyesters can comprise crosslinked polyesters, including alkyd polyesters. In some embodiments, a polyester can have a molecular weight of less than about 5000. In some embodiments, polyesters for use in sizing compositions of the present invention comprise adipic acid polyesters such as Desmophene polyesters commercially available from Bayer AG. In other embodiments, polyesters for use in sizing compositions of the present invention can comprise bisphenol A polyesters such as Neoxil 954D which is commercially available from DSM, B.V. of the Netherlands.

In some embodiments, the at least one additional component of a sizing composition of the present invention can comprise an epoxide. Suitable epoxides, according to some embodiments, comprise EPON epoxides and EPI-REZ epoxides commercially available from Miller-Stephenson Products. In some embodiments, suitable epoxides can comprise low molecular weight polyester epoxides and/or low molecular weight polyurethane epoxides.

The at least one additional component, in some embodiments, can comprise a polyvinylpyrrolidone. Examples of polyvinylpyrrolidones suitable for use in sizing compositions of the present invention, in some embodiments, are commercially available from GAF Corporation under the PVP K-30 trade designation. In some embodiments, suitable polyvinylpyrrolidones can also include Sokolan CP45, Sokolan CP9, and Sokolan CP13S from BASF.

In a further embodiment, the at least one additional component can comprise a fatty acid ester of a polyethylene glycol (PEG). In some embodiments, a fatty acid ester can comprise a diester of a polyethylene glycol with tallic acid. One example of a suitable diester of a polyethylene glycol and tallic acid is commercially available from BASF Corp. under the trade designation MAPEG-600-DOT.

In some embodiments, a sizing composition of the present invention comprises at least one maleic acid copolymer, at least one coupling agent, and at least one additional component comprising a polyester, polyvinyl alcohol, polyurethane, polyvinylpyrrolidone, fatty acid ester of a polyethylene glycol, acrylic, wax, chemically modified rosin, or epoxide. Each of these components are discussed above in connection with those embodiments where these components are used with a reaction product of an alkoxylated amine and a polycarboxylic acid, which is further reacted with an epoxy compound.

In some embodiments, the at least one additional component is present in an amount of at least about 40 weight percent of the sizing composition on a total solids basis. In another embodiment, the at least one additional component is present in an amount of at least about 50 weight percent of the sizing composition on a total solids basis. In some embodiments, the at least one additional component is present in an amount greater than about 70 weight percent of the sizing composition on a total solids basis. Moreover, in some embodiments, the at least one maleic acid copolymer and the at least one coupling agent can be present in any amount consistent with those described above for other embodiments.

In another aspect, some embodiments of the present invention are directed to a glass fiber at least partially coated with any of the sizing compositions described herein. For example, in some embodiments, a glass fiber can be at least partially coated with a sizing composition comprising at least one maleic anhydride copolymer, at least one coupling agent, and a reaction product of an alkoylated amine with a polycarboxylic acid, which is further reacted with an epoxy compound. In some embodiments, the reaction product of an alkoxylated amine and a polycarboxylic acid, which is further reacted with an epoxy compound is present in an amount greater than about 40 weight percent of the sizing composition on a total solids basis. In some embodiments, the reaction product of an alkoxylated amine and a polycarboxylic acid, which is further reacted with an epoxy compound is present in an amount greater than about 70 weight percent on a total solids basis.

In some embodiments, a sizing composition for at least partially coating a glass fiber further comprises at least one additional component comprising a polyester, polyvinyl alcohol, polyurethane, polyvinylpyrrolidone, fatty acid ester of a polyethylene glycol, acrylic, wax, chemically modified rosin, or epoxide.

The type of glass fibers to be sized may be determined by various factors such as, but not limited to, the intended end use of the sized glass fibers. For example, the glass fibers may be any type so long as the glass fibers are compatible with a thermoplastic resin to be reinforced. In some embodiments, the average diameter of the glass fibers can be greater than 8 µm. In other embodiments, the average diameter of the glass fibers can be less than 25 µm. The selection of a nominal diameter of a glass fiber according to embodiments of the present invention can depend on a number of factors including the amount of glass desired in the end product, the desired strength of the glass, the diameters of glass fibers frequently manufactured at a particular location, and others.

Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. Typical formulations of glass fibers are disclosed in K. Lowenstein, *The Manufacturing Technology of Continuous Glass Fibers*, (3$^{rd}$ Ed. 1993).

Sizing compositions of the present invention can be applied to glass fibers by suitable methods known to one of skill in the art such as, but not limited to, by contacting glass fibers with a static or dynamic applicator, such as a roller or belt applicator, or by spraying, or by other means. The overall concentration of the non-volatile components in the sizing composition can be adjusted over a wide range according to the means of application to be used, the character of the glass fiber to be sized, and the weight of dried size coating desired for intended use of the sized glass fibers. In some embodiments, the sizing composition can be applied to glass fibers in the forming operation of the fibers.

In another aspect, some embodiments of the present invention relate to fiber glass strands. In some embodiments, a fiber glass strand comprises a plurality of glass fibers, wherein at least one of the plurality of glass fibers is at least partially coated with one of the sizing compositions disclosed herein. For example, some embodiments of a fiber glass strand can comprise at least one maleic acid copolymer, at least one coupling agent, and a reaction product of an alkoxylated amine with a polycarboxylic acid, which is further reacted with an epoxy compound. In some embodiments, the reaction product of an alkoxylated amine and a polycarboxylic acid, which is further reacted with an epoxy compound is present in an amount greater than about 40 weight percent of the sizing composition on a total solids basis. In some embodiments, the reaction product of an alkoxylated amine and a polycarboxylic acid, which is further reacted with an epoxy compound is present in an amount greater than about 70 weight percent on a total solids basis.

In some embodiments, a sizing composition for at least partially coating a fiber of a glass strand further comprises at least one additional component comprising a polyester, polyvinyl alcohol, polyurethane, polyvinylpyrrolidone, fatty acid ester of a polyethylene glycol, acrylic, wax, chemically modified rosin, or epoxide.

Some embodiments of the present invention relate to rovings comprising a plurality of fiber glass strands of the present invention. The rovings can be assembled, in some embodiments, by winding the plurality of strands into a single package using a roving winder. In other embodiments, the rovings can be assembled at a point of use such that the plurality of fiber glass strands are not wound into a single package, but rather are unwound from their respective packages (e.g., forming packages or direct draw packages), combined into a single roving, and provided to another processing unit. For example, the rovings (whether wound into a roving package or assembled at a point of use) can be provided to a bath comprising a thermoplastic resin, can be chopped, can be compounded, etc. Fiber glass strands and rovings can be continuous in some embodiments, while in other embodiments can be shortened (e.g., chopped) prior to use. Thus, depending on the application, glass fiber strands and glass fiber rovings, according to some embodiments of the present invention, can be any desired length. In some embodiments, fiber glass rovings of the present invention comprise rovings as described in U.S. Patent Publication No. 2003/0172683 A1, which is hereby incorporated by reference in its entirety, except that at least some of the glass fibers used in the rovings of the present invention are at least partially coated with one of the sizing compositions described herein.

As provided herein, chopped glass fibers at least partially coated with a sizing composition of the present invention can have any desired length. In some embodiments, chopped glass fibers have a length greater than about 3 mm. In another embodiment, chopped glass fibers have a length up to about 50 mm. In some embodiments, chopped glass fibers have a length up to about 25 mm. In some embodiments, chopped glass fibers have length greater than about 50 mm.

In other embodiments, the present invention relates to glass fiber reinforced thermoplastic or thermoset composites. In some embodiments, glass fiber reinforced thermoplastic or thermoset composites comprise a thermoplastic resin or a thermoset resin and at least one glass fiber at least partially coated with one of the sizing compositions described herein. For example, in some embodiments, a glass fiber reinforced composite can comprise a thermoplastic resin or thermoset resin and at least one glass fiber at least partially coated with a sizing composition comprising at least one maleic anhydride copolymer, at least one coupling agent, and a reaction product of an alkoxylated amine with a polycarboxylic acid, which is further reacted with an epoxy compound.

In some embodiments, the sizing composition used to coat glass fibers in a thermoplastic or thermoset composite can further comprise at least one additional component comprising a polyester, polyvinyl alcohol, polyurethane, polyvinylpyrrolidone, fatty acid ester of a polyethylene glycol, acrylic, wax, chemically modified rosin, or epoxide.

In some embodiments of fiber reinforced thermoplastic or thermoset composites, glass fibers in the composite can have an average aspect ratio of at least 50. A fiber reinforced thermoplastic or thermoset composite, in some embodiments, can comprise a plurality of glass fibers having an average aspect ratio of at least 100. In some embodiments, fiber reinforced thermoplastic or thermoset composites can comprise a plurality of glass fibers having an average aspect ratio of at least 200. In other embodiments, a fiber reinforced thermoplastic or thermoset composite can comprise a plurality of glass fibers having an average aspect ratio of at least 500. A fiber reinforced thermoplastic or thermoset composite, in some embodiments, can comprise a plurality of glass fibers having an average aspect ratio of at least 600. Fiber reinforced thermoplastic or thermoset composites, in some embodiments, can comprise a plurality of glass fibers having an average aspect ratio less than 1500. In other embodiments, a fiber reinforced thermoplastic or thermoset composite can comprise a plurality of glass fibers having an average aspect ratio less than 1200. A fiber reinforced thermoplastic or thermoset composite in some embodiments can comprise a plurality of glass fibers having an average aspect ratio less than 1000. In a other embodiments, a fiber reinforced thermoplastic or thermoset composite can comprise a plurality of glass fibers having an average aspect ratio greater than 1500.

A fiber reinforced thermoplastic or thermoset composite, according to some embodiments, can comprise a plurality of glass fibers at least partially coated with a sizing composition of the present invention. In one embodiment, the plurality of glass fibers can be present in an amount of at least about 10 weight percent of the thermoplastic or thermoset composite. In another embodiment, the plurality of glass fibers can be present in an amount of at least about 20 weight percent of the thermoplastic or thermoset composite. In some embodiments, the plurality of glass fibers can be present in an amount of at least about 30 weight percent of the thermoplastic or thermoset composite. The plurality of glass fibers, in some embodiments, can be present in an amount up to about 90 weight percent of the thermoplastic or thermoset composite. In other embodiments, the plurality of glass fibers can be present in an amount up to about 80 weight percent on at total solids basis. In another embodiment, the plurality of glass fibers can be present in an amount up to about 75 weight percent of the thermoplastic or thermoset composite. A fiber reinforced composite comprising a plurality of glass fibers, in some embodiments, can be in the form of a pellet.

Glass fibers coated with a sizing composition of the present invention may be combined with numerous thermoplastic resins to form fiber glass reinforced thermoplastic composite articles. Examples of thermoplastic materials available include polyolefins, polyacetals, polyamides (nylons), polycarbonates, polystyrenes, styrene-acrylonitrile copolymers, acrylonitrile-butadiene styrene (ABS) copolymers, polyvinyl chloride (PVC), polyethylene terephthalates, polybutylene terephthalates, and blends of thermoplastic resins.

In one embodiment, the thermoplastic resin reinforced with sized glass fibers comprises a polyamide resin such as, but not limited to, polyamide 6,6; polyamide 4,6; polyamide 6,10; polyamide 6,12; polyamide 6T (polyhexamethylene terephthalamide) and polyamide 6I (polyhexamethylene isophthalamide) obtained by condensation polymerization of a diamine with a dicarboxylic acid; polyamide 9T; polyamide 6 and polyamide 12 obtained by ring-opening polymerization of a lactam; polyamide 11 obtained by self-condensation polymerization of a ω-aminocarboxylic acid; and copolymers and blends thereof. A particular polyamide resin may be chosen based on a resin's mechanical characteristics, heat resistance, crystallizing temperature, moldability and appearance of moldings.

The polyamide thermoplastic resins, in some embodiments, can be lubricated with a fatty acid metal salt such as sodium, lithium, calcium, magnesium, zinc or aluminum salt of a fatty acid having 9 or more carbon atoms such as capric acid, lauric acid, myristic acid, palmitic acid, stearic acid, behenic acid, cerotic acid, montanic acid, melissic acid, oleic acid and erucic acid. Additionally, two or more fatty acid metal salts may be jointly used. The fatty acid metal salt can be used to reduce torque during melt-kneading of the thermoplastic polyamide resin and sized glass fibers in an extruder, to improve the mold release characteristics of the resin, or improve the melt flow of the resin during injection molding. In one embodiment, calcium stearate is used to lubricate a polyamide resin to be reinforced with sized glass fibers. A caprolactam blocked isocyanate, as described in connection with sizing compositions of the present invention, can improve the strength of the calcium stearate lubricated polyamide resin.

In some embodiments, additional additives can be incorporated into a fiber reinforced polyamide resin including, without limitation, stabilizers, fire retardants, fillers, and impact modifiers. Examples of additional additives that can be added in some embodiments comprise one or more heat stabilizers including, without limitation, copper iodide and potassium iodide blends, such as Polyad Preblend 201 from Ciba Specialties. In some embodiments, a heat stabilizer can comprise phenolic anti-oxidants such as, and without limitation, Irganox 1009 and Irganox 245 from Ciba Specialties. An impact modifier, in some embodiments, can comprise maleic anhydride grafted rubbers, such as, and without limitation, Exxelor VA1803 from Exxon Mobile.

Glass fibers coated with a sizing composition of the present invention may also be combined with numerous thermoset resins to form fiber glass reinforced thermoset composite articles. In some embodiments, thermoset resins reinforced with glass fibers of the present invention comprise polyester resins, polyimide resins, phenolic resins, vinyl ester resins, or epoxy resins.

In a further aspect, some embodiments of the present invention relate to methods of making fiber reinforced thermoplastic or thermoset composites. In some embodiments, a method of making a fiber reinforced thermoplastic or thermoset composite comprises providing a plurality of continuous glass fibers, at least partially coating the plurality of continuous glass fibers with any of the sizing compositions of the present invention and disposing the plurality of coated fibers in a thermoplastic resin. In one embodiment, for example, a method of making a fiber reinforced thermoplastic or thermoset composite comprises providing a plurality of continuous glass fibers, at least partially coating the plurality of continuous glass fibers with a sizing composition comprising at least one maleic anhydride copolymer, at least one coupling agent, and a reaction product of an alkoxylated amine with a polycarboxylic acid, which is further reacted with an epoxy compound and disposing the plurality of glass fibers in a thermoplastic or thermoset resin, In some embodiments, disposing the plurality of sized glass fibers in a thermoplastic or thermoset resin comprises drawing the plurality of sized glass fibers into a liquid thermoplastic or thermoset resin. In some embodiments, a liquid thermoplastic resin comprises a polyamide resin.

In some embodiments of a method of making a fiber reinforced thermoplastic or thermoset composite, the sizing composition further comprises at least one additional component comprising a polyester, polyvinyl alcohol, polyurethane, polyvinylpyrrolidone, fatty acid ester of a polyethylene glycol, acrylic, wax, chemically modified rosin, or epoxide.

A method of making a fiber reinforced thermoplastic or thermoset composite, according to some embodiments, further comprises chopping the plurality of continuous glass fibers and thermoplastic or thermoset resin into pellets. In other embodiments, a method of making a fiber reinforced thermoplastic or thermoset composite further comprises molding the plurality of continuous glass fibers and thermoplastic or thermoset resin.

In some embodiments, a method of making a fiber reinforced thermoplastic composite comprises a G-LFT (Granular-Long Fiber Technology) method. In other embodiments, a method of making a fiber reinforced composite comprises a D-LFT (Direct-Long Fiber Technology) method. In a further embodiment, a method of making a fiber reinforced composite comprises a C-LFT (Continuous Long Fiber Technology) method allowing the production of impregnated tapes.

In G-LFT methods, long glass fiber granules or pellets are produced through a thermoplastic pultrusion process. Sizing compositions of the present invention facilitate impregnation of the glass fibers with a polymeric resin. The impregnated glass fibers are plasticized in an extruder in a gentle manner which avoids damage to or breakage of the fibers. The granules or pellets are subsequently formed into a molded article of desired shape by compression molding or injection molding processes. The long fiber granules or pellets impregnated with a polymeric resin are provided as a semi-finished product and are usually manufactured at a location separate from that where the granules or pellets are formed into molded articles by compression or injection molding techniques.

In D-LFT methods, the step of providing granules or pellets of glass fibers pre-impregnated with a polymeric resin as a semi-finished product is eliminated as compounding systems are integrated with molding systems to provide long-fiber reinforced composite materials in one step from raw materials. Continuous strands of glass fibers, for example, are provided and drawn into an extruder for compounding with plasticized polymer resin in a manner that prevents significant reduction in the lengths of the strands. Alternatively, chopped strands of glass fibers can also be provided and introduced into an extruder for compounding with plasticized polymer resin. The hot compound is subsequently fed in-line into a compression or injection molding apparatus for the production of molded articles.

Some exemplary embodiments of the present invention will now be illustrated in the following specific, non-limiting examples.

EXAMPLE 1

| Sizing Composition Formulation (20 L) | |
|---|---|
| Sizing Composition Component | Amount (g) |
| Acetic Acid (80% active in water) | 24 |
| Silane[1] | 72 |
| Maleic Anhydride Copolymer[2] | 900 |
| Reaction Product[3] | 3375 |
| water (balance to 20 liter) | — |

[1]DYNASYLAN AMEO, commercially available from Degussa AG of Dusseldorf
[2]Ethylene/MA - 20% active, ammonia neutralized solution in water of an alternating copolymer of ethylene and maleic anhydride (EMA from Zeeland Chemicals, Inc.)
[3]Reaction product of phthalic anhydride with an alkoxylated primary amine (e.g., Trymeen 6617), which is further reacted with a Bisphenol A diglycidyl ether (EPON 880 or EPON 828LS or EPIKOTE 880 from Hexion Specialty Chemicals), 20% active in water.

The sizing composition of Example 1 was prepared by providing about 115 kg of demineralized water in a binder tank with an agitator. The specified amount of acetic acid was added to the water in the binder tank and agitated for five minutes. After agitation, the specified amount of silane was added to the binder tank and the resulting solution was agitated for 10 minutes. Following agitation for 10 minutes, the specified amounts of maleic anhydride copolymer and the Reaction Product were added to the binder tank. The solution was balanced to 20 liters with additional demineralized water. The resulting sizing composition had a pH of 7.5.

A Reaction Product of an alkoxylated amine and polycarboxylic acid, which is further reacted with an epoxy compound for use in the sizing composition of Example I was prepared as follows. A reaction mixture of a primary alkoxylated amine (Trymeen 6617) and a polycarboxylic acid (phthalic anhydride) was prepared in a mix tank wherein the molar ratio of the primary alkoxylated amine to polycarboxylic acid was 1:2. The resulting reaction mixture was heated to 200° C. and held at 200° C. for one hour. During the heating, $CO_2$ was bubbled through the reaction mixture.

After one hour, the reaction mixture was cooled to 150° C., and an aromatic epoxy compound (EPON 880 or EPON 828LS or EPIKOTE 880 commercially available from Hexion Specialty Chemicals of Columbus, Ohio) was added to the mix tank, wherein the molar ratio of alkoxylated amine to aromatic epoxy compound was 1:2. The resulting reaction mixture was heated to 200° C. over a period of 10 to 15 minutes to produce a solid Reaction Product. The Reaction Product was solubilized in demineralized water to form a solution or dispersion of the Reaction Product.

The following Examples 2-5 can also be made according to the foregoing procedure with maleic anhydride and any other components being added to the binder tank after the silane.

EXAMPLE 2

| Sizing Composition Formulation (20 L) | |
|---|---|
| Sizing Composition Component | Amount (g) |
| Acetic Acid | 24 |
| Silane[4] | 72 |
| Maleic Anhydride Copolymer[5] | 900 |
| Reaction Product[6] | 1125 |

-continued

| Sizing Composition Formulation (20 L) | |
| --- | --- |
| Sizing Composition Component | Amount (g) |
| Additional Component[7] | 776 |
| water (balance to 20 liter) | — |

[4]DYNASYLAN AMEO, commercially available from Degussa AG of Dusseldorf
[5]Ethylene/MA - 20% active, ammonia neutralized solution in water of an alternating copolymer of ethylene and maleic anhydride (EMA from Zeeland Chemicals, Inc.)
[6]Reaction product of phthalic anhydride with an alkoxylated primary amine (e.g., Trymeen 6617), which is further reacted with a Bisphenol A diglycidyl ether (EPON 880 or EPON 828LS or EPIKOTE 800 from Hexion Specialty Chemicals), 20% active in water.
[7]Witcobond W290H from Baxenden, 60% active in water

EXAMPLE 3

| Sizing Composition Formulation (20 L) | |
| --- | --- |
| Sizing Composition Component | Amount (g) |
| Acetic Acid | 24 |
| Silane[8] | 72 |
| Maleic Anhydride Copolymer[9] | 900 |
| Reaction Product[10] | 1688 |
| Additional Component[11] | 1688 |
| water (balance to 20 liter) | — |

EXAMPLE 4

| Sizing Composition Formulation (20 L) | |
| --- | --- |
| Sizing Composition Component | Amount (g) |
| Acetic Acid | 24 |
| Silane[12] | 72 |
| Maleic Anhydride Copolymer[13] | 900 |
| Polyurethane[14] | 1164 |
| water (balance to 20 liter) | — |

EXAMPLE 5

| Sizing Composition Formulation (20 L) | |
| --- | --- |
| Sizing Composition Component | Amount (g) |
| Acetic Acid | 24 |
| Silane[15] | 72 |
| Maleic Anhydride Copolymer[16] | 900 |
| Blocked Isocyanate[17] | 2077 |
| water (balance to 20 liter) | — |

[8]DYNASYLAN AMEO, commercially available from Degussa AG of Dusseldorf
[9]Ethylene/MA - 20% active in water, ammonia neutralized solution in water of an alternating copolymer of ethylene and maleic anhydride (EMA from Zeeland Chemicals, Inc.)
[10]Reaction product of phthalic anhydride with an alkoxylated primary amine (e.g., Trymeen 6617), which is further reacted with a Bisphenol A diglycidyl ether (EPON 880 or EPON 828LS or EPIKOTE 880 from Hexion Specialty Chemicals), 20% active in water.
[11]Mowiol-3-85 from Kuraray, 20% active in water.
[12]DYNASYLAN AMEO, commercially available from Degussa AG of Dusseldorf
[13]Ethylene/MA - 20% active, ammonia neutralized solution in water of an alternating copolymer of ethylene and maleic anhydride (EMA from Zeeland Chemicals, Inc.)
[14]Witcobond W290H from Baxenden, 20% active in water.
[15]DYNASYLAN AMEO, commercially available from Degussa AG of Dusseldorf
[16]Ethylene/MA - 20% active ammonia neutralized solution in water of an alternating copolymer of ethylene and maleic anhydride (EMA from Zeeland Chemicals, Inc.)
[17]Rhodocoat WT-1000 from Rhodia, 33% active in water.

Desirable characteristics, which can be exhibited by various, but not all, embodiments of the present invention, can include, but are not limited to, the provision of sizing compositions that can advantageously assist in maintaining the strength of a glass fiber reinforced thermoplastic, such as a long fiber reinforced thermoplastic; the provision of sizing compositions that can facilitate processing of long glass fibers in techniques such as G-LFT (Granular-Long Fiber Technology), D-LFT (Direct-Long Fiber Technology), and/or C-LFT (Continuous-Long Fiber Technology), and others.

Various embodiments of the invention have been described herein. It should be recognized that these embodiments are merely illustrative of one or more of the principles of the present invention. Numerous modifications and adaptations thereof will be readily apparent to those skilled in the art without departing from the spirit and scope of the present invention.

That which is claimed is:

1. A polyamide-compatible sizing composition comprising:
    at least one maleic anhydride copolymer, which is present in an amount greater than 10% by weight on a total solids basis;
    at least one coupling agent; and
    a third component that is a reaction product of an alkoxylated amine and a polycarboxylic acid, which is further reacted with an epoxy compound;
    wherein the third component is present in an amount greater than about 50 weight percent of the sizing composition on a total solids basis.

2. The sizing composition of claim 1, wherein the third component is present in an amount greater than about 70 weight percent of the sizing composition on a total solids basis.

3. The sizing composition of claim 1, wherein the at least one maleic anhydride copolymer comprises a maleic anhydride monomer and a monomer selected from the group consisting of ethylene, butadiene, isobutylene, and mixtures thereof.

4. The sizing composition of claim 3, wherein the at least one maleic anhydride copolymer is present in an amount less than about 50 weight percent of the sizing composition on a total solids basis.

5. The sizing composition of claim 3, wherein the at least one maleic anhydride copolymer is present in an amount up to about 40 weight percent of the sizing composition on a total solids basis.

6. The sizing composition of claim 1, wherein the maleic anhydride copolymer comprises carboxylate moieties, carboxylate salt moieties, amide moieties, imide moieties, or combinations thereof.

7. The sizing composition of claim 1, wherein the at least one coupling agent comprises a silane.

8. The sizing composition of claim 7, wherein the silane comprises an aminosilane.

9. The sizing composition of claim 1 wherein the at least one coupling agent is present in an amount up to about 20 weight percent of the sizing composition on a total solids basis.

10. The sizing composition of claim 1, further comprising at least one additional component, the at least one additional component comprising a polyester, polyvinyl alcohol, polyurethane, polyvinylpyrrolidone, fatty acid ester of a polyethylene glycol, acrylic, wax, chemically modified rosin, or epoxide.

11. The sizing composition of claim 1, wherein the alkoxylated amine comprises an alkoxylated fatty amine.

12. The sizing composition of claim 11, wherein the alkoxylated fatty amine comprises an alkoxylated dodecyl amine, alkoxylated tetradecyl amine, alkoxylated hexadecyl amine, alkoxylated stearyl amine, alkoxylated octadecyl amine, or mixtures thereof.

13. The sizing composition of claim 1, wherein the alkoxylated amine comprises an ethoxylated amine, a propoxylated amine, a butoxylated amine, or mixtures thereof.

14. The sizing composition of claim 1, wherein the polycarboxylic acid comprises an aromatic polycarboxylic acid.

15. The sizing composition of claim 14, wherein the aromatic carboxylic acid comprises phthalic acid, terephthalic acid, isophthalic acid, or mixtures thereof.

16. The sizing composition of claim 1, wherein the epoxy compound comprises a polyepoxy compound.

17. The sizing composition of claim 16, wherein the polyepoxy compound comprises a diglycidyl ether, diglycidyl ester, or mixtures thereof.

18. The sizing composition of claim 17, wherein the diglycidyl ether comprises an alkyl diglycidyl ether, aromatic diglycidyl ether, or mixtures thereof.

19. The sizing composition of claim 18, wherein the aromatic diglycidyl ether comprises a bisphenol A diglycidyl ether.

20. A glass fiber at least partially coated with the sizing composition of claim 1.

21. The glass fiber of claim 20, wherein the glass fiber is a continuous glass fiber.

22. The glass fiber of claim 20, wherein the glass fiber is a chopped glass fiber.

23. The glass fiber of claim 22, wherein the chopped glass fiber has a length of at least about 3 mm.

24. The glass fiber of claim 22, wherein the chopped glass fiber has a length up to about 50 mm.

25. The glass fiber of claim 22, wherein the chopped glass fiber has a length greater than about 50 mm.

26. A composite composition comprising:
a polyamide resin; and
a plurality of glass fibers according to claim 20.

27. The composite composition of claim 26, wherein the plurality of glass fibers have an average aspect ratio of at least 50.

28. The composite composition of claim 26, wherein the plurality of glass fibers have an average aspect ratio of at least 200.

29. The composite composition of claim 26, wherein the plurality of glass fibers are present in an amount of at least about 10 weight percent of the composite.

30. The composite composition of claim 26, wherein the plurality of glass fibers are present in an amount up to about 90 weight percent of the composite.

31. The sizing composition of claim 1, wherein the at least one maleic anhydride copolymer is present in an amount less than about 40 weight percent of the sizing composition on a total solids basis and wherein the at least one coupling agent is present in an amount between about 2 and about 15 weight percent of the sizing composition on a total solids basis.

32. A method of making a glass fiber reinforced composite comprising:
providing a plurality of continuous glass fibers;
at least partially coating the plurality of continuous fibers with a sizing composition comprising: (a) at least one maleic anhydride copolymer, which is present in an amount greater than 10% by weight on a total solids basis, (b) at least one coupling agent, and (c) a third component that is a reaction product of an alkoxylated amine and a polycarboxylic acid, which is further reacted with an epoxy compound, which is present in an amount greater than about 50 weight percent on a total solids basis; and
disposing the plurality of coated continuous glass fibers in a polyimide resin.

33. The method of claim 32, further comprising chopping the plurality of coated continuous glass fibers prior to disposing the glass fibers in the polyamide resin.

34. The method of claim 32, wherein the at least one maleic anhydride copolymer is present in an amount less than about 40 weight percent of the sizing composition on a total solids basis and wherein the at least one coupling agent is present in an amount between about 2 and about 15 weight percent of the sizing composition on a total solids basis.

35. A polyamide-compatible sizing composition comprising:
at least one maleic anhydride copolymer, which is present in amount greater than 10% by weight on a total solids basis;
at least one coupling agent; and
a third component that is a reaction product of an alkoxylated amide and a polycarboxylic acid, which is further reacted with an epoxy compound;
wherein the third component is present in an amount greater than about 50 weight percent of the sizing composition on a total solids basis.

36. The sizing composition of claim 35, wherein the at least one maleic anhydride copolymer is present in an amount less than about 40 weight percent of the sizing composition on a total solids basis and wherein the at least one coupling agent is present in an amount between about 2 and about 15 weight percent of the sizing composition on a total solids basis.

37. A polyamide-compatible sizing composition comprising:
at least one acrylic polymer, which is present in an amount greater than 10% by weight on a total solids basis;
at least one coupling agent; and
a third component that is a reaction product of an alkoxylated amine and a polycarboxylic acid, which is further reacted with an epoxy compound;
wherein the third component is present in an amount greater than about 50 weight percent of the sizing composition on a total solids basis.

38. The sizing composition of claim 37, wherein the at least one acrylic polymer comprises polyacrylic acid, polymethacrylic acid, polymethylmethacrylate, or combinations thereof.

39. The sizing composition of claim 37, wherein the at least one acrylic polymer is present in an amount less than about 30 weight percent of the sizing composition on a total solids basis and wherein the at least one coupling agent is present in an amount between about 2 and about 15 weight percent of the sizing composition on a total solids basis.

* * * * *